United States Patent [19]

Pollock

[11] 4,407,718
[45] Oct. 4, 1983

[54] LONG VERTICAL SHAFT BIOREACTOR WITH PRESSURIZED HEAD TANKS

[75] Inventor: David C. I. Pollock, Richmond Hill, Canada

[73] Assignee: C-I-L Inc., North York, Canada

[21] Appl. No.: 318,390

[22] Filed: Nov. 5, 1981

Related U.S. Application Data

[63] Continuation of Ser. No. 159,350, Jun. 13, 1980, abandoned.

[30] Foreign Application Priority Data

Oct. 26, 1979 [CA] Canada .................................. 338535

[51] Int. Cl.³ .............................................. C02F 3/12
[52] U.S. Cl. .................... 210/626; 210/629; 210/741; 210/744; 210/104; 210/109; 210/120; 210/195.3; 210/220
[58] Field of Search ............... 210/608, 621, 622, 623, 210/626, 627, 629, 741, 744, 97, 104, 109, 120, 123, 128, 129, 130, 132, 195.1, 195.3, 220, 221.2, 744; 137/571, 593

[56] References Cited

U.S. PATENT DOCUMENTS

| | | | |
|---|---|---|---|
| 2,640,027 | 5/1953 | McNamee | 210/608 |
| 3,444,076 | 5/1969 | Sekikawa | 210/221.2 |
| 3,772,187 | 11/1973 | Othmer | 210/627 |
| 3,892,659 | 7/1975 | Kirk | 210/744 |
| 4,217,211 | 8/1980 | Crane | 210/629 |
| 4,287,070 | 9/1981 | Pollock | 210/744 |

FOREIGN PATENT DOCUMENTS 54-120953 9/1979 Japan .............................. 210/221.2
1473665 11/1973 United Kingdom ................ 210/629

OTHER PUBLICATIONS

Proceedings of the 31st Industrial Waste Conference, May 4,5,6, 1976, Purdue University, Ann Arbor, USA, pp. 344-351.

*Primary Examiner*—Ernest G. Therkorn
*Attorney, Agent, or Firm*—Donald G. Ballantyne

[57] ABSTRACT

An improvement is provided in the operation of a long vertical shaft bioreactor in the treatment of waste which comprises circulating waste liquor and oxygenating gas through the bioreactor in which the uppermost portion of the shaft (the surface basin) is under supra-atmospheric pressure. The use of a pressurized surface basin subjects the waste to improved oxidizing conditions in a critical zone of the bioreactor and results in more effective biodegradation of the waste. By precise control of surface basin pressure, adequate levels of oxygen in the waste are maintained for biodegradation purposes while unwanted gas, such as carbon dioxide and nitrogen, are disengaged. The pressure on the surface of the waste in the basin is controlled so as to ensure that the concentration of oxygen in the waste is subsaturated and retained while the unwanted gas concentration is super saturated and becomes disengaged.

5 Claims, 1 Drawing Figure

U.S. Patent    Oct. 4, 1983    4,407,718
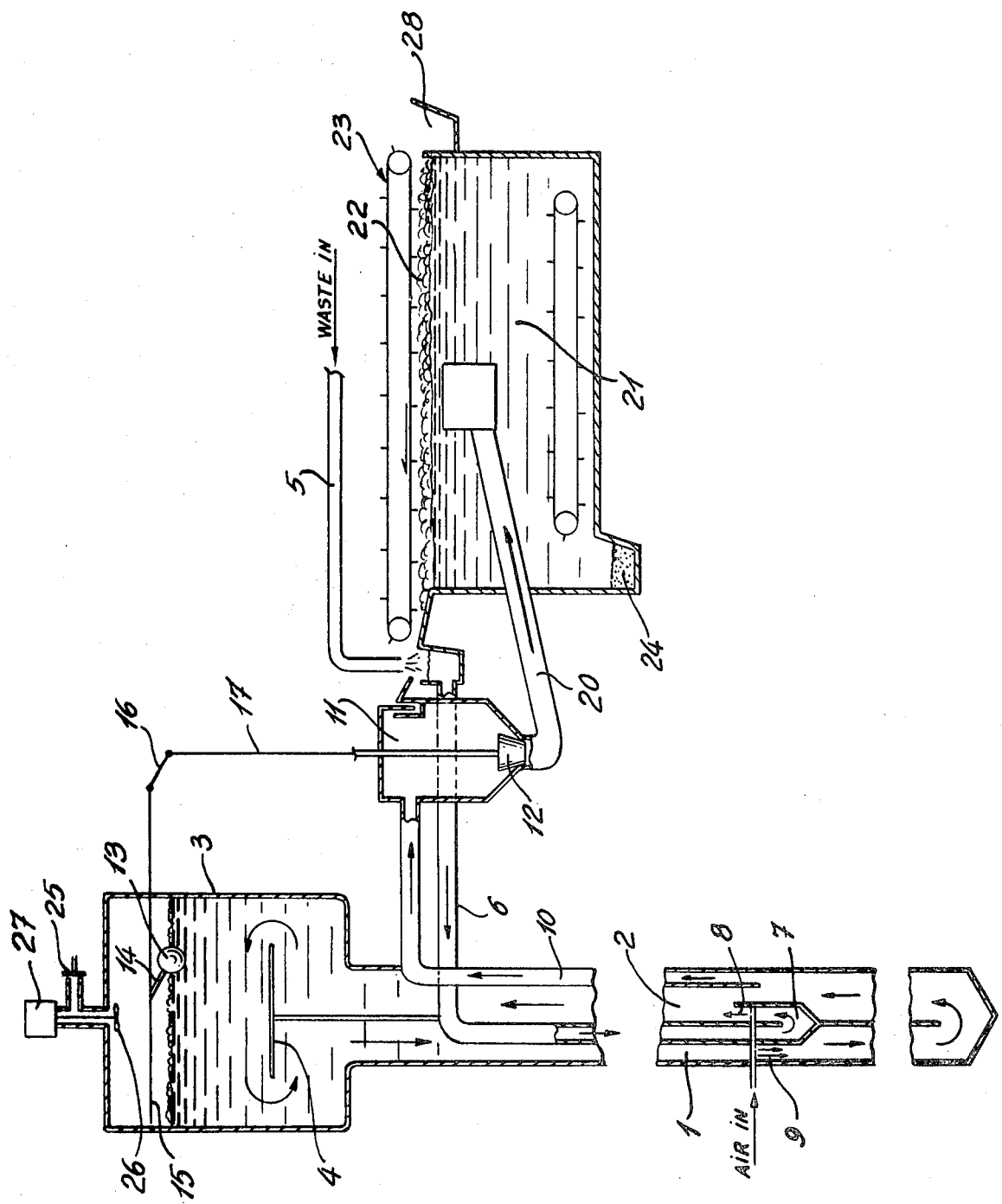

LONG VERTICAL SHAFT BIOREACTOR WITH PRESSURIZED HEAD TANKS

This application is a continuation-in-part application of the U.S. patent application Ser. No. 159,350 filed on June 13, 1980, now abandoned.

This invention relates to a long vertical shaft modified activated sludge waste treatment process and to a method for improving the utilization of oxygen dissolved in the waste in the critical upper surface area of the shaft.

Long vertical shaft bioreactors suitable for the treatment of aqueous fluidized sewage or industrial waste employing a modified activated sludge process are known, having been disclosed, for example, in Canadian Pat. No. 1,033,081 to Bailey et al. Such bioreactors comprise a circulatory system which includes at least two and sometimes more substantially long vertical chambers communicating with each other at their upper and lower ends, the upper ends being connected to a surface basin where disengagement of gas from the waste takes place. For simplicity, the apparatus and method hereinafter referred to will be generally described in terms of a single downcomer chamber and a single riser chamber connected at their upper and lower ends. The waste liquor, normally consisting of water, organic matter, sludge and nutrients, is caused to descend one chamber, the downcomers, and ascend the other chamber, the riser, during which circulation an oxygen-containing gas is injected into the waste liquor resulting in biodegradation of the waste.

Normally, the waste liquor is driven through the system by the injection at depth of an oxygen-containing gas, usually air, into one or both of the chambers. At start-up of the bioreactor, the injection of air will normally be made into the liquor in the riser where it serves to reduce the density of the liquor and hence acts in the nature of an air lift pump. Once waste liquor circulation has begun, air injection can then be made into the downcomer, the liquor in the downcomer having a higher density than the liquor/air mixture in the riser, thus providing sufficient momentum to maintain a circulation. Influent waste liquor is, in the process of Bailey et al., introduced into the basin at a position adjacent to the upper end of the downcomer chamber. Treated waste liquor is withdrawn from the basin at a position adjacent to the upper end of the riser chamber. The basin is preferably fitted with a baffle which acts to force waste liquor leaving the riser to traverse a major part of the basin before descending the downcomer. During this traverse, the waste liquor yields up gases such as oxygen, carbon di-oxide and nitrogen, dissolved therein.

The injected oxygen-containing gas, normally air, dissolves in the liquid-borne waste as the liquor descends the downcomer to regions of greater depth and greater hydrostatic pressure. As the circulating waste ascends from depth in the riser to regions of lower hydrostatic pressure, the dissolved gases come out of solution and form bubbles. When this liquid/bubble mixture from the riser enters the basin, the gas bubbles migrate upward through the liquor and disengage. A reaction between waste liquor, oxygen, nutrients and biomass takes place during circulation through the system and the products of the reaction are carbon dioxide, additional biomass and cellular material in the form of a sludge. In addition, air (oxygen) and residual nitrogen gas are also contained in the liquor.

The term waste liquor or waste liquid as herein employed is understood to include water or other fluid carrying any type of biologically degradable domestic and industrial waste materials, for example, normal domestic waste and the effluents produced by farms, food factories, breweries and other industries.

During the normal operation of a long vertical shaft bioreactor as described by Bailey et al. in Canadian Pat. No. 1,033,081, the quantity or level of oxygen dissolved in the circulating waste mixed liquor changes from a very low value at the level of the basin at atmospheric pressure to a maximum in the riser chamber at a position at from about 200 feet to 400 feet below the basin in a 500 foot shaft. The riser chamber contains the highest level of dissolved oxygen, most of which oxygen comes out of solution and is liberated as the waste reaches ambient pressure in the surface basin. During circulation through the system, the waste liquor is thus not under complete oxidizing conditions during its entire circulation cycle. In the downcomer chamber in the zone between the basin and the point of injection of the oxygen-containing gas, very little dissolved oxygen is contained in the waste liquor and consequently very little oxidation of the waste takes place in this zone.

It has now been found that the operation of a long vertical shaft bioreactor can be improved and the oxidation zone substantially enlarged by converting the surface basin into an enclosed head tank and by creating a controlled back pressure in the enclosed head tank. The control of pressure in the enclosed head tank is accomplished by a combination of (a) maintaining a constant level of waste liquor in the head tank by means of control of the influent and effluent flows through the bioreactor and (b) providing a pressure controlled vent in the head tank for the release of gas which collects above the liquid surface in the head tank. By operating the bioreactor surface basin under controlled pressure conditions, adequate oxygen levels can be maintained in the upper section of the reactor shaft so that the waste is subjected to oxidation conditions continuously during its circulation. While some cases will be liberated from supersaturated waste solutions, even under low pressure conditions, this liberation is not sufficient to inhibit the continuous oxidation and biodegradation of the waste.

The improved design of long vertical shaft bioreactor of this invention requires that the waste liquor be drawn into the reactor by force since both downcomer and riser chambers are at pressure greater than ambient. This drawing in of liquor can be accomplished by the use of an air lift device at the outlet of the waste liquour influent line where it empties into the riser chamber as described in our copending application Ser. No. 300,997 or by the use of a mechanical pump in the waste liquor influent line or a combination of both.

Means used for controlling the pressure exerted by the gas in the enclosed head tank may be, for example, a relief valve venting gas from above the liquid in the head tank. Alternatively, gas in the space above the liquid in the head tank may be vented through a conduit discharging beneath a predetermined depth of water in an auxiliary tank, which auxiliary tank may also function as a foam-collecting reservoir.

The invention is illustrated by the accompanying drawing which depicts a generalized diagrammatic elevation of the long vertical shaft bioreactor of this invention showing the enclosed, vented head tank and also an interconnected separation/flotation vessel.

Referring to the drawing, the main downcomer chamber of the long vertical shaft bioreactor is shown at 1 and the main riser chamber at 2. These chambers are joined at there lower end and are connected at their top to an enclosed head tank 3 to form a circulatory system. A baffle 4 serves to deflect the circulating waste so that it traverses the breadth of the head tank 3. Waste liquor, from for example, a municipal collector, enters the system from pipe 5 through influent duct 6 which terminates in a U-shaped exhaust member 7 and which discharges upwards into main riser 2. In or near outlet of U-shaped member 7 is a sparger 8 which injects an oxygen-containing gas into the incoming waste acting both to oxygenated the waste liquor and to suck and lift the waste into the riser 2. A second sparger is shown at 9, which sparger serves to inject an oxygen-containing gas into the waste in the main downcomer chamber 1. Treated waste liquor is drawn off riser 2 through effluent duct 10 which discharges into cylindrical swirl tank 11 and passes plug valve 12 and through duct 20 to separation/flotation tank 21. The direction of waste flow is indicated by arrows. Valve 12 is arranged to open and close in response to the level of the liquid in head tank 3. Control of valve 12 is governed by float 13 resting on the surface of the liquid in head tank 3. Float 13 is carried by arm 14 connected to rotatable shaft 15. To the external end of shaft 15 is fastened bell crank 16 which is connected by cable 17 to valve 12. Thus when the level of the liquid in head tank 3 rises, valve 12 will open admitting effluent into flotation tank 11. Overflow in swirl tank 11 passes through a side opening 18 and weir 19 where it is added to the influent in duct 6. Floating sludge 22 collected on the surface of the effluent in flotation tank 21 may be swept by mechanical means 23 to return to waste influent duct 6. Likewise, sedimented sludge is collected in recess 24 of tank 21. Decanted, treated water passes into collector 28. Head tank 3 is fitted with relief valve 25 which is adapted to control the pressure in the head tank within narrow limits. Head tank 23 is also fitted with a foam breaking impeller 26 driven by electric motor 27.

Prior to the start up of the process of this invention, all ducts and chambers are substantially filled with waste liquor. As additional waste liquor is drawn through the influent duct 6 into the main riser 2 by injecting an oxygen-containing gas into the exhaust outlet 7 of the influent duct 6 or is forced by a mechanical pump (not shown) through the influent duct 6 to a position immediately above riser gas sparger 8, the injected gas becomes entrained in the riser liquid causing increased voidage therein. The liquid in riser 2 containing air bubbles is less dense than the influent liquid and so the liquid level in riser 2 increases. Where a non-pressurized or open head tank bioreactor is employed, there normally would be a difference in level of 10 to 20 feet between the running level in the head tank and the static level. With an enclosed head tank as shown at 3, the force of the expanded contents in the riser produces supra atmospheric pressure in head tank 3. With closed head tank 3 operating at supra atmospheric pressure, the solubility of oxygen in the waste liquor is increased leading to increased dissolved oxygen in the waste available for the biochemical reaction. With the pressure of gas in head tank 3 at, typically, about ⅓ an atmosphere above ambient pressure, there will be more oxygen in solution in circulating waste. At the same time, reaction product carbon di-oxide and residual nitrogen will be liberated at this pressure. The oxygen-containing gas, normally air, injected at spargers 8 and 9 comprises about four/fifths nitrogen. As oxygen is consumed in the biodegradation process, the inert nitrogen level rapidly increases to four or five times its saturation value at ⅓ atmosphere pressure. Hence even at this supra atmospheric pressure large amounts of nitrogen are liberated in the head tank 3 while substantially all the oxygen is retained in the waste liquor. Thus the waste liquor is in contact with oxygen (and the biomass already present in the riser) continuously from its entry at depth at exhaust member 7 into the riser 2, through the head tank 3 and down the downcomer 1 to the point of further injection of an oxygen-containing gas at sparger 9. The waste liquor with entrained gas bubbles descends in downcomer 1 to regions of greater hydrostatic pressure causing increased solution in the waste of gaseous oxygen. The waste liquor then ascends the riser 2 and, with decreasing hydrostatic pressure, some of the dissolved gas comes out of solution forming small bubbles. The ascending oxygenated waste liquor reaches the point of entry of raw waste water at exhaust member 7 with which it mixes. Thus in its complete traverse of the bioreactor the waste liquor and contained biomass is in continuous contact with substantial amounts of oxygen and is relieved of substantial amounts of nitrogen and carbon dioxide.

A portion of the treated waste liquor is drawn off from riser 2 through duct 10 at a position lower in riser 2 than the point of injection of oxygen-containing gas from sparger 8. This portion of drawn-off treated waste contains few large size gas bubbles and is conducted upwards in effluent duct 10 to swirl tank 11 where any large air bubbles are disengaged and thence to flotation tank 21 where floating and sedimented sludge are separated, the floating sludge being recycled to influent duct 6 by surface sweeper 23. As the waste liquor rises in effluent duct 10, the hydrostatic pressure decreases causing dissolved gas to come out of solution in the liquid in the form of very small bubbles, which small bubbles are most suitable for effective flotation of the sludge.

With the bioreactor operating under supra atmospheric pressure because of the pressurized head tank, the amount of effluent leaving the system is required to be equal to the amount of influent plus the amount of waste liquor contained in the several recycle streams. In the embodiment illustrated in the drawing this equivalence is maintained by means of float 13 in head tank 3 which controls the opening of the valve 12 and regulates the flow of the effluent into flotation tank 11. If the rate of influent entering the bioreactor exceeds the rate of effluent discharging from the bioreactor, the liquid level in head tank 3 will rise, opening valve 12 and permitting additional effluent to discharge into flotation tank 11. Conversely, if the influent entry is less then the effluent discharge, the liquid level in head tank 3 will fall resulting in the closing of valve 12 and thus restricting effluent discharge. the process and apparatus of the invention provides for the close control of the liquid level and hence the liquid volume in head tank 3. Uncontrolled increase in volume of waste entering the reactor would require increased retention and circulation time for treatment and could result in oxygen shortages due to the increased oxygen demand of the biomass.

It will be appreciated by those skilled in the art that if influent is introduced into the bioreactor at a position adjacent the upper end of the downcomer, it will be necessary to add the influent by pump to overcome the pressure contained in head tank 3.

The head tank 3 of the bioreactor of this invention is vented through relief valve 25 or through a vent tube (not shown). Foaming is characteristic of many industrial and some municipal wastes. A means for reducing the volume of foam is desirable if the amount of waste treated is not to be limited by excess foam to below an economic level. In the bioreactor of this invention, foam produced in riser 2 collects on the surface of the liquid in pressurized head tank 3 where it is broken up and collapsed by means of foam-breaking impeller 26 driven by motor 27.

In the method of the present invention the air pressure of oxygen-containing gas required to initiate operation of the bioreactor is the same as the running pressure. Therefore, extra compressor capacity is not required for start up purposes.

EXAMPLE

In a typical long vertical shaft bioreactor installation having an unpressurized head tank and operating on brewery effluent, it was determined by analysis that oxygen was consumed at the rate of 10 mg/liter of mixed liquor/min. in a three foot depth of waste liquor in the head tank. For adequate degassing, gas bubble rise through the head tank liquor was approximately 0.1 ft/sec., requiring a travel time of 30 seconds through the three feet of mixed liquor. The liquid level in the head tank was maintained at a three foot level using the method disclosed in U.S. Pat. No. 4,279,754. Waste liquor from the head tank was returned to the downcomer shaft where it descended at a velocity of 3 ft/sec. Additional air was injected into the returned waste liquor in the downcomer at a point 180 feet below the head tank which added air was carried downward by the flow of liquor in the downcomer. A given portion of the descending liquor was therefore available for a period of 60 seconds for further oxidation between the head tank and the point of air injection in the downcomer. At an oxygen consumption rate similar to that measured in the head tank (i.e. 10 mg/l/min.), additional 10 mg/l of oxygen, if available, could have been consumed by the descending waste liquor during the time interval and distance of its downcomer travel. To satisfy these oxidation conditions, a dissolved oxygen level of 15 mg/l in the head tank liquor is required—5 mg/l for consumption in the head tank itself and 10 mg/l for consumption in the 180 feet of downcomer liquor. However, saturation solubility of oxygen at substantially atmospheric pressure in the head tank and normal operating temperatures of 25°–30° C. is only about 8 mg/l, the nitrogen solubility being about 14 mg/l. Hence the amount of excess dissolved oxygen in the head tank waste liquor is deficient for any useful carry-over into the downcomer flow. Inclosing the head tank and pressurizing it by up to one additional atmosphere raised the oxygen solubility in the head tank liquor to about 15 mg/l and the nitrogen to 27 mg/l thereby satisfying the oxygen requirements of the particular system. Most of the excess (super saturation) gas, (carbon dioxide and nitrogen), nevertheless were found to escape from the liquid surface in the head tank where they were vented to the atmosphere through a pressure relief valve. Furthermore, it was found that treated waste liquor which was directed from the riser chamber to a separation/flotation vessel contained in excess of 100 mg/l of total dissolved gases most of which comprised nitrogen. Substantially all of these gases became disengaged from the waste liquor in the flotation vessel.

The following Table shows the amount of dissolved oxygen in the head tank and in the downcomer chamber for various head tank pressures in the long vertical shaft bioreactor described in the above example.

TABLE

| Super Atmospheric Pressure in Head Tank | Dissolved $O_2$ Concentration mg/l Head Tank Entry | Dissolved $O_2$ Concentration mg/l Head Tank Exit to Downcomer | Depth to $O_2$ Depletion in Downcomer (ft.) | Length of Anoxic Zone 180"-Depth of $O_2$ Depletion |
|---|---|---|---|---|
| 0 | 8 | 3 | 54 | 126 |
| ¼ | 12 | 7 | 126 | 54 |
| ¾ | 14 | 9 | 162 | 18 |
| 1 | 16 | 11 | 198 | 0 |

From the results tabulated above it can be seen that by the slight pressurization of the head tank a substantial improvement in the efficiency of the oxidation of waste liquor in the downcomer chamber can be achieved through elimination of the anoxic zone, which improvement is accomplished without requiring any increase in the energy required to circulate the waste through the bioreactor. Since air was added to the downcomer at a position 180 feet below the head tank, less than one atmosphere of excess pressure in the head tank was required to maintain aerobic conditions throughout the bioreactor.

What I claim is:

1. An improved activated sludge waste treatment process wherein an aerobic biological reaction takes place during the continuous circulation of a waste liquor in an apparatus including a surface basin, a long vertical downcomer chamber, a long vertical riser chamber operatively communicating with the downcomer through the basin and at the lower end of the downcomer to form a loop, and including means to introduce influent waste liquor at depth into said riser and to discharge effluent waste liquor at depth from said riser at a location lower in the said riser than the point of influent introduction and including means to circulate waste liquor through the said riser and downcomer in the presence of oxygen-containing gas, the improvement comprising surrounding said surface basin in a gas tight enclosure, maintaining a substantially constant level of waste liquor in said basin while maintaining the surface of waste liquor in said basin under supra-atmospheric pressure to control the degree of gas disengagement from the waste liquor in the said basin.

2. A process as claimed in claim 1 wherein the said circulation is accomplished by means of air lift in the said vertical riser chamber.

3. A process as claimed in claim 1 wherein the degree of supra-atmospheric pressure in the said apparatus is controlled.

4. An improved long vertical shaft bioreactor comprising a surface basin, a long vertical downcomer chamber, a long vertical riser chamber operatively communicating with said downcomer through said basin and at the lower end of the downcomer to form a loop, means for introducing influent waste liquor at depth into said riser and to discharge effluent waste liquor at depth from said riser at a location lower in the said riser than the point of influent introduction, means for circulating waste liquor through said loop in the presence of oxygen-containing gas, the improvement comprising providing a means to maintain a substantially constant level of waste liquor in the said basin, and a gas-tight enclosure surmounting the said basin to provide supra-atmospheric pressure on the surface of the waste liquor in said basin to control the degree of gas disengagement from said basin liquor.

5. An apparatus as claimed in claim 4 wherein the said gas-tight enclosure contains an excess pressure relief vent.

* * * * *